(12) United States Patent
Sasaki (10) Patent No.: US 8,736,891 B2
(45) Date of Patent: May 27, 2014

(54) APPARATUS, METHOD AND MEDIUM STORING A PROGRAM FOR GENERATING AN IMAGE AFTER VARIABLE MAGNIFICATION BY ARRANGING A CALCULATED NUMBER OF NORMALIZED TILE OR UNIT IMAGES IN A DRAWING REGION (75) Inventor: Hidemi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 13/086,838

(22) Filed: Apr. 14, 2011

(65) Prior Publication Data
US 2011/0273728 A1 Nov. 10, 2011

(30) Foreign Application Priority Data
May 6, 2010 (JP) ................................. 2010-106619

(51) Int. Cl.
G06K 15/02 (2006.01)
(52) U.S. Cl.
USPC ......................................................... 358/1.2
(58) Field of Classification Search
None
See application file for complete search history.

(56) References Cited

U.S. PATENT DOCUMENTS

| 5,774,236 A * | 6/1998 | Blazey .......................... 358/3.14 |
| 7,574,071 B2 * | 8/2009 | Clarke et al. .................. 382/298 |
| 2002/0039456 A1 * | 4/2002 | Miura et al. ................... 382/299 |
| 2005/0190411 A1 * | 9/2005 | Ohno ............................ 358/3.28 |
| 2008/0055650 A1 * | 3/2008 | Chung et al. .................. 358/3.06 |
| 2008/0151324 A1 * | 6/2008 | Shimizu et al. ............... 358/474 |

FOREIGN PATENT DOCUMENTS

| JP | 06-214554 | 8/1994 |
| JP | 2005-198250 | 7/2005 |
| JP | 2009-277001 A | 11/2009 |

OTHER PUBLICATIONS

Japanese Office Action dated Apr. 8, 2014, issued in counterpart Japanese Application No. 2010-106619.

* cited by examiner

*Primary Examiner* — Fan Zhang
(74) *Attorney, Agent, or Firm* — Fitzpatrick, Cella, Harper & Scinto (57) ABSTRACT

An image forming apparatus and method perform variable-magnification processing of an image while a change in an impression of an image and the processing load are suppressed. The image forming apparatus generates a normalized tile image in a tile image and calculates the number of the normalized tile images that can be arranged in a drawing region after variable magnification. If the number is not less than a first threshold value, data including a tile image in which the normalized tile images in the number are arranged in the drawing region after the variable magnification is generated as data after the variable magnification.

14 Claims, 10 Drawing Sheets

PRIOR ART

141% MAGNIFICATION ⇒

(A) TILE IMAGE
32×32 PIXEL (B) TILE IMAGE AFTER
VARIABLE MAGNIFICATION
45×45 PIXEL (C) EXAMPLE OF
DRAWING USING (A)

(D) EXAMPLE OF
DRAWING USING (B)

APPARATUS, METHOD AND MEDIUM STORING A PROGRAM FOR GENERATING AN IMAGE AFTER VARIABLE MAGNIFICATION BY ARRANGING A CALCULATED NUMBER OF NORMALIZED TILE OR UNIT IMAGES IN A DRAWING REGION

BACKGROUND OF THE INVENTION

1. Field of the Invention

The present invention particularly relates to an image forming apparatus, an image forming method and a program that variably magnify and form an image of an electronic document file including a drawing of a tile image.

2. Description of the Related Art

In many recent printer products, a touch panel including UI as an operation panel is mounted. A media-direct print capability in which a user can connect a storage device, such as an SD card or a USB storage, to a printer, and directly perform selection of an electronic document file stored in the storage device, print setting, and print instruction via an operation panel is widely spreading. With the spread of this type of printer, the method of using electronic document files is being diversified.

In the case of printing from a printer driver having been used so far, appropriate print data according to an output resolution is prepared from an electronic document file at each printing. Thus, even if the print data is output as it is, no deterioration in an image quality, such that a tile pattern included in the electronic document file is lost, occurs and a desirable print result can be obtained.

On the other hand, with the diversification of the method of using electronic document files, print data is sometimes output in various modes. When the electronic document file is to be printed, an output resolution different from the resolution specified when the print data was created can be specified at image formation. For example, as a printing setting, an output resolution can be specified for printing a poster in which one logical page in PDL data can be imposed on a plurality of physical pages of output sheets. Alternatively, the output resolution can be specified for imposition printing in which a plurality of logical pages in the PDL data is imposed on one physical page of an output sheet. Also, in the media-direct printing, a function called index printing might be incorporated. This is a function of reducing and printing a specified arbitrary file as a list. If the resolution of the data is different from the resolution to be output as above, so-called variable magnification processing is required.

Thus, a scalable expression using a path and the like not depending on the resolution is used in the drawing description in an electronic document file, in general, and a desirable output result is obtained even in the case of output with a different resolution by the variable magnification processing. However, many of bitmap data and mask data in the electronic document file are stored in a data format depending on the resolution. If the data dependent on the resolution is output by specifying a variable magnification, there has been a problem that a pixel is missing or only specific lines are overlapped and the like.

In order to prevent such a problem, a method of forming an image with a desired resolution by variably magnifying the tile image itself has been known as a prior-art technology. For example, a technology is known in which a denominator to a density of a tile image and a denominator of a variable magnification rate are both set at prime numbers to each other so as to suppress the occurrence of an interference pattern (See Japanese Patent Laid-Open No. H06-214554 (1994), for example).

However, even if such prior-art technologies are used, the density of the tile image drawn after variable magnification might be different from that of the original tile image before the variable magnification. Also, a characteristic (a checkered pattern, a vertical line, a diagonal line and the like, for example) of the original tile might be lost by the magnifying/reducing method of the tile image.

On the other hand, a technology of variable magnification to a desired resolution after image formation with a resolution of the PDL data is also known. For example, if a copy-forgery-inhibited pattern and print data are to be combined, a technology is known in which the copy-forgery-inhibited pattern is divided into some regions and variably magnified, while a tile pattern in them is maintained (See Japanese Patent laid-Open No. 2005-198250, for example).

If an appropriate image variable magnification algorithm is used for an image to be variably magnified as above, a desirable output image can be obtained. However, since the image size for one page is extremely large, it is disadvantageous in terms of a used amount of memory. In the case of an A4-sized RGB image, it has approximately 100 MB in terms of a RAW image. If an appropriate variable magnification algorithm considering surrounding pixels is used, the calculation amount is also increased, which may also be disadvantageous in terms of performance.

SUMMARY OF THE INVENTION

The present invention has an object to provide an image forming apparatus, an image forming method, and a program that perform variable magnification processing of an image while a change in impression and the processing load of the image are suppressed.

An image forming apparatus according to the present invention includes a unit configured to generate a normalized tile image, which is a unit image of repetition in a tile image; a unit configured to calculate the number of the normalized tile images that can be arranged in a drawing region after variable magnification of the tile image with a predetermined variable magnification rate; and a unit configured to generate a tile image in which the normalized tile images of the number are arranged in the drawing region after the variable magnification, as the tile image after the variable magnification, if the number is not less than a first threshold value.

According to the present invention, an image forming apparatus, an image forming method, and a program that can perform variable magnification processing while a change in impression and a processing load of the image are suppressed can be provided.

Further features of the present invention will become apparent from the following description of exemplary embodiments with reference to the attached drawings.

DESCRIPTION OF THE EMBODIMENTS

A best mode for carrying out the present invention will be described below by using the attached drawings.

Figure 1:
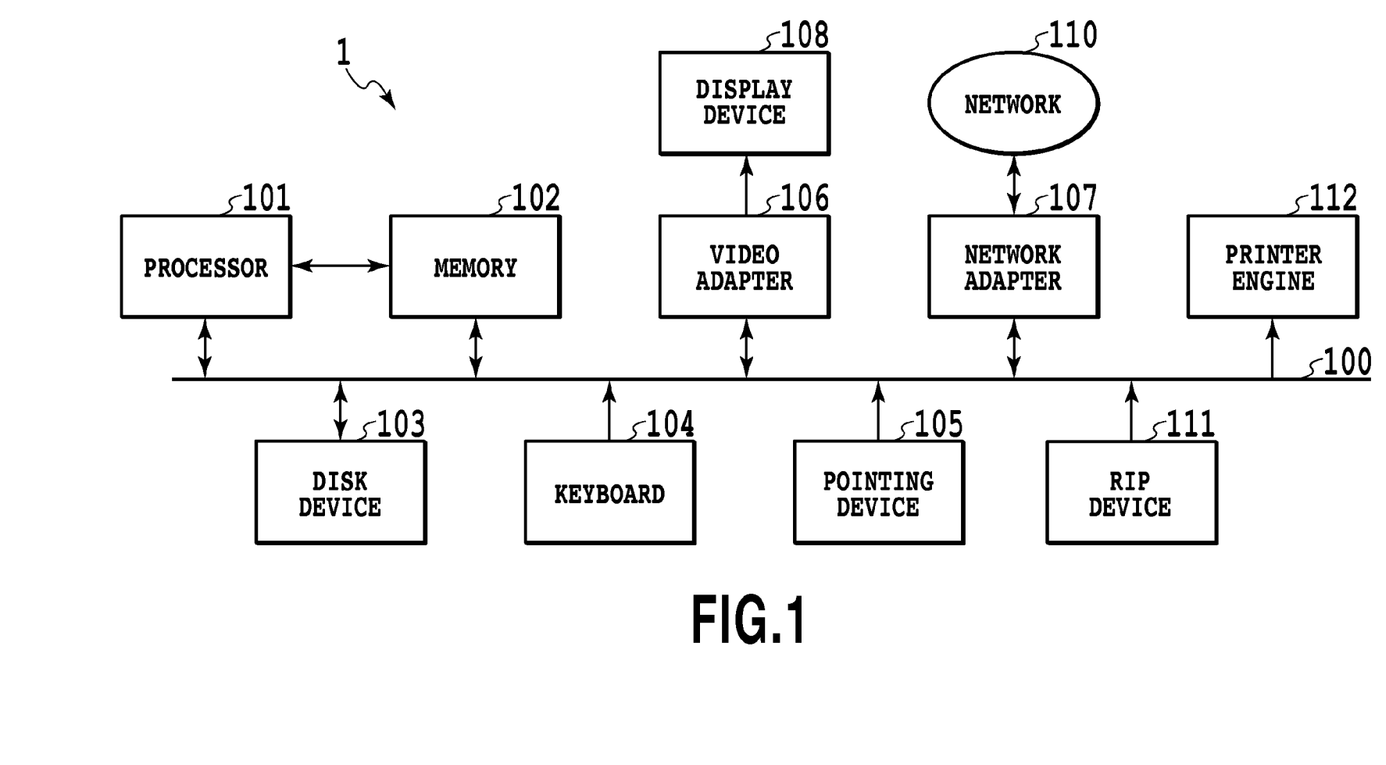
FIG. 1 is a diagram illustrating a hardware configuration of an image forming apparatus.

FIG. 1 is a block diagram illustrating a system configuration example of an image forming apparatus (printing apparatus) 1 according to an embodiment of the present invention. In FIG. 1, a processor 101 is connected to a memory 102, a disk device 103, a keyboard 104, a pointing device 105, a video adaptor 106, and a network adaptor 107 via a bus 100. Similarly, the processor 101 is also connected to a RIP device 111 and a printer engine 112. To the video adaptor 106, a display device 108 is connected.

The memory 102 stores programs and data used by the processor 101. The processor 101 controls each of the above-described constituent portions in accordance with the predetermined programs stored in the memory 102. Also, in the disk device 103, programs and data required for processing performed by the image forming apparatus 1 are recorded. Two or more of the disk devices 103 may be connected. The disk device 103 is constituted by a storage device such as a ROM, a hard disk, a USB storage, an SD card, and a network storage, but they are not limiting.

A user can input information in the image forming apparatus 1 through the keyboard 104 and the pointing device 105. Also, various types of information can be displayed on the display device 108 by the video adaptor 106. Moreover, the image forming apparatus 1 can be connected to a network 110 via the network adaptor 107.

The flow of processing in the media-direct printing will be described below. A user who is to perform the media-direct printing connects the storage device such as the USB storage or the SD card as the disk device 103 to the image forming apparatus 1. The user gives an instruction to display a menu screen for the media-direct printing to the image forming apparatus 1 via the keyboard 104 or the pointing device 105. This may be configured such that the menu screen for the media-direct printing is automatically displayed on the display device 108 when the processor 101 automatically detects connection of the USB storage or the like. The processor 101 displays a list of files contained in the disk device 103 on the display device 108. The user selects a file to be processed from the list of files displayed on the display device 108 by using the keyboard 104 or the pointing device 105. At that time, print settings, such as the number of sets to be output, the output sheets, the color/monochrome output, the staple specification, the double-sided specification and the like may be also made. Then, the user instructs the image forming apparatus 1 to execute printing. Alternatively, the user may select a part or the whole of the files contained in the disk device 103 and give an output instruction of index printing. In this case, a thumb-nail image of the selected files and information such as file names are printed. These print instructions are stored as a print job in the memory 102 and sequentially executed by the processor 101.

If a print instruction is given by the user to the image forming apparatus 1, the processor 101 executes the program stored in the memory 102 and interprets the electronic document file. According to the interpretation result, the RIP device 111 forms an image, and the printer engine 112 prints the formed image on a physical sheet.

The processor 101 obtains information of the file name contained in the print instruction from the user and reads the file corresponding to the file name from the disk device 103 as print data. The processor 101 determines the PDL language in order to process data in the file from characteristic of at least either one of the content or the file name of the file. The processor 101 executes interpretation processing of the file, page-generation processing on the basis of the result of the interpretation processing, drawing processing, and page-end processing and the like in accordance with the syntax of the determined PDL language. The page-generation processing is processing of ensuring a region for holding a display list generated in the drawing processing, which will be described later, in the memory 102. Also, in the page-generation processing, other initialization processing performed at the start of a page is also executed. The drawing processing is processing of interpreting a drawing instruction described in the file and of conversion to a display list that the RIP device 111 can interpret. This display list includes specification of the color to be painted or a tile pattern, the specification of a region to be drawn, and the specification of a region to be clipped. The page-end processing is end processing of processing of a logical page currently being processed, and release of resources that are no longer used and the like are performed. The generated display list is output to the RIP device 111. The RIP device 111 forms an image on the basis of the display list and stores it in the memory 102. The printer engine 112 performs printing on a physical sheet on the basis of the image formed in the memory 102. Since the present invention particularly relates to the drawing processing using a tile image, the details of the other processing will be omitted.

Figure 2:
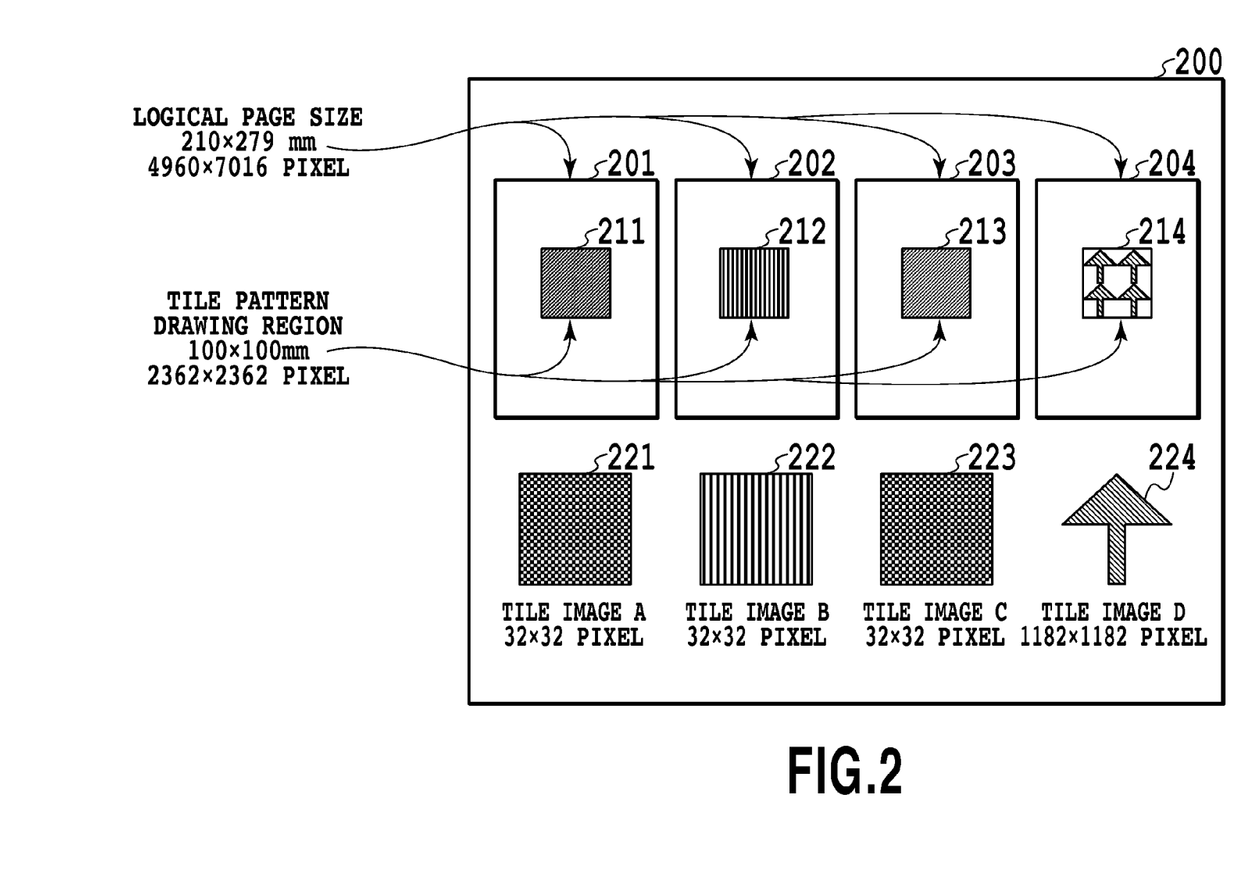
FIG. 2 is a diagram illustrating an example of test data of a tile image.

FIG. 2 illustrates test data 200 used in explaining this embodiment. The test data 200 includes logical pages 201 to 204 having an A4 size (210×297 mm or 4960×7016 pixels in 600 dpi conversion). These logical pages 201 to 204 include rectangles painted by repeated tile images (100×100 mm or 2362×2362 pixels in 600 dpi conversion) 211 to 214. A tile image A (221) has a checkered pattern of 32×32 pixels. A tile pattern B (222) includes vertical stripes having 32×32 pixels. A tile pattern C (223) has a checkered pattern of 32×32 pixels with one white pixel at the lower right. A tile image D (224) has an arrow pattern of 50×50 mm (1182×1182 pixels in 600 dpi conversion).

Embodiment 1

As Embodiment 1, a case of an enlargement rate at one or more will be described, referring to an example where the A4-size test data is to be output to an A3-size (297×420 mm or 7016×9922 pixels in 600 dpi conversion) physical sheet. In order to match the width/height of the output sheet size, the respective logical page is subjected to a variable magnification of enlargement to 141% (=9922/7016). Also, the rectangle drawn on the logical page is drawn with the size of 141×141 mm (3331×3331 pixels in 600 dpi conversion).

Figure 3:
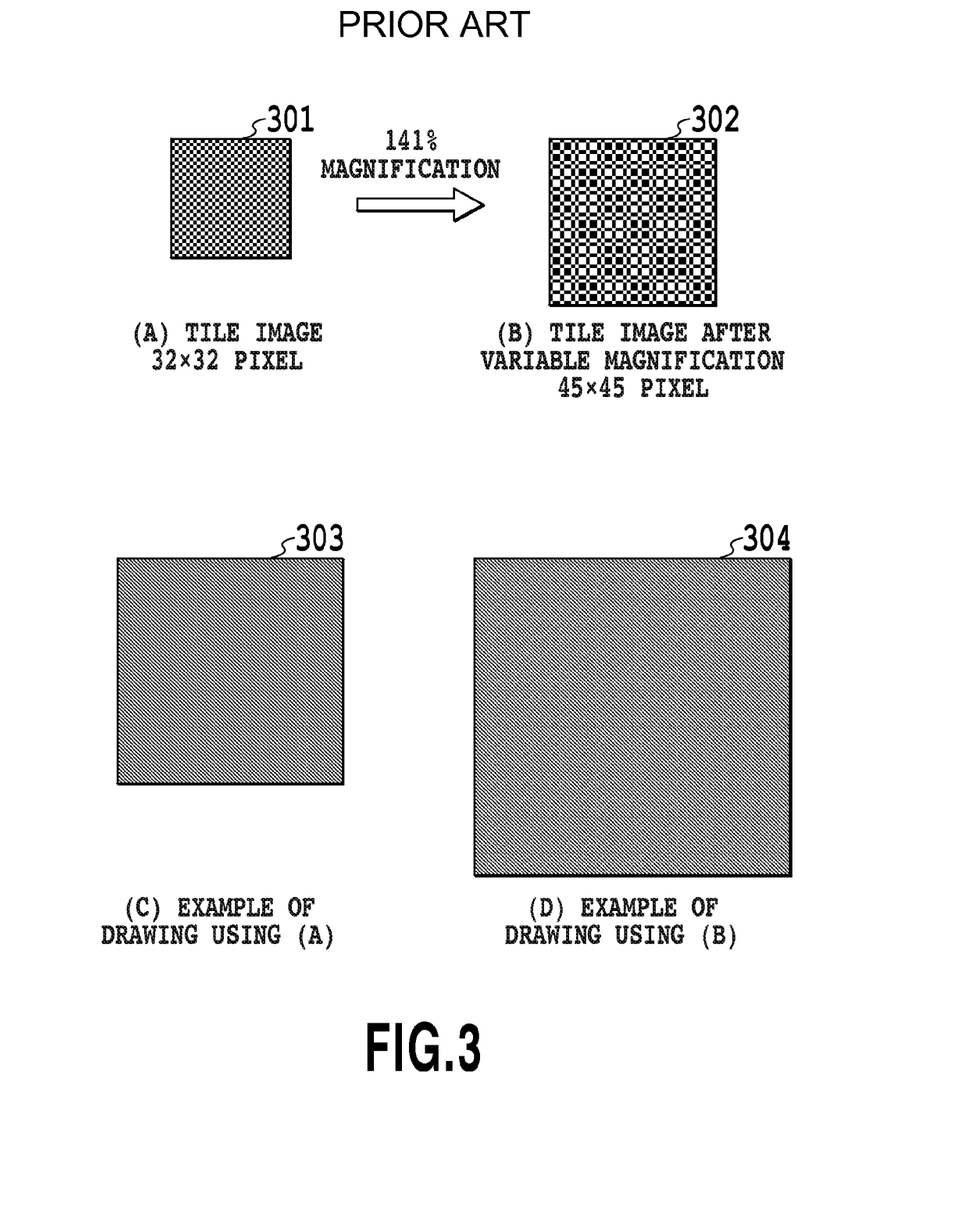
FIG. 3 is a diagram illustrating examples of incorrect drawings by variable magnification of the tile image.

First, referring to FIG. 3, a prior-art case in which the tile image itself is variably magnified and drawn will be described. If a tile image 301 having the size of 32 rows and 32 columns with the data resolution (hereinafter, the expression of 32×32 pixels will be used for the size of an image) is drawn with the same magnification, an output image 303 is obtained. If the entire page is magnified to 141% and output, the tile image 301 is magnified with the magnification rate of 141% so as to form a tile image 302 having 45×45 pixels. Then, by drawing using this magnified tile image 302, an output image 304 is obtained. However, when the magnified tile image 302 is closely watched, the 13 rows in the 32 rows contained in the original tile image 301 are overlapped in the drawing by two rows, and the 19 rows are drawn by only one row. In the same way, the 13 columns in the 32 columns are overlapped in the drawing by two columns, and the 19 columns are drawn by only one column. Thus, a pattern not in the output image 302 appears in the output image 304. As described above, if the tile image is variably magnified and drawn in accordance with the variable magnification rate of the entire page, an appropriate output might not be obtained.

Referring to the flowchart in FIG. 4, an example of the steps of preferable variable magnification processing of image data in this embodiment will be described below. This processing is performed by the processor 101 that executes the program stored in the memory 102 and the like.

This processing is started after the image forming apparatus 1 receives image data containing a tile image via a receiving device, such as the disk device 103 or the network adapter 107, and print setting is specified by a setting device such as the keyboard 104 or the pointing device 105.

First, in accordance with the specified print setting, a variable magnification rate for variably magnifying the received image data is calculated (S401). For example, if the A4-size data is to be output to the A3-size physical sheet as described above, the magnification rate is 141% (1.41).

It is determined if the calculated magnification rate is one or not (S402), and if it is one, the tile image is output with the same magnification (S403).

If the magnification rate is not one, first, a normalized tile image to the tile image to be drawn is generated (S404). Here, the tile image is an image constituted by repeating small regions made of the same image. The normalized tile image is an image into which only one small region, which is a unit of repetition in the original tile image, is extracted. That is, the normalized tile image is a unit image of repetition in the tile image.

Here, an example of a method of generating a normalized tile image will be described in detail using the flowchart shown in FIG. 5 and a schematic diagram shown in FIG. 6.

First, it is determined if the width of the tile image is not less than two or not (S501). If the width is not less than two, it is determined if the patterns match or not when the tile image is divided into right and left halves with reference to the center (S502). The matching here includes not only perfect matching of the patterns but also substantial matching. That is, if the patterns of the right and left tile images do not have a difference by a predetermined amount or more, it is determined that the patterns match each other. If the right and left patterns match each other, either one of the right and left tile images is deleted (width-direction deletion) (S503). Since it is likely that duplication still remains at this time, S501 is executed again. If the width becomes one or if the right and left tile images do not match, the width-direction deletion is finished.

Subsequently, it is determined if the height of the tile image is not less than two or not (S504). If the height is not less than two, it is determined if the patterns match each other when the tile image is divided into upper and lower halves (S505). The matching here also includes the substantial matching as above. If the upper and lower tile images match each other, either one of the upper and lower tile images is deleted (height-direction deletion) (S506). Since it is likely that duplication still remains at this time, S504 is executed again. If the height becomes one or if the upper and lower tile images do not match, the height-direction deletion is finished.

Figure 5:
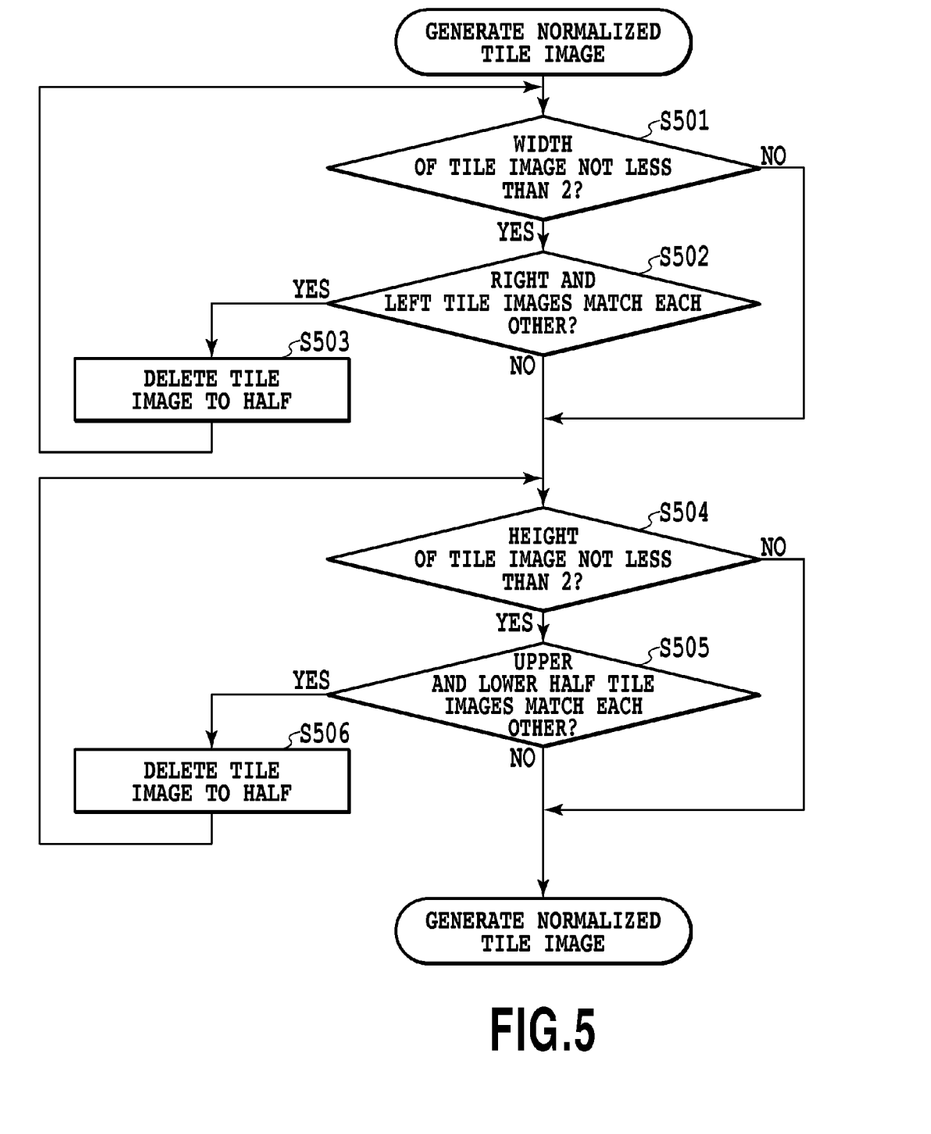
FIG. 5 is a flowchart illustrating an example of a normalized tile-image-generation processing.

That is, according to the processing shown in FIG. 5, the width-direction deletion is executed for the tile images until the right and left image patterns become different patterns with a difference of not less than a predetermined amount. Moreover, the height-direction deletion is executed for the tile images until the upper and lower image patterns become different images with a difference of not less than a predetermined amount.

By means of the above processing, the normalized tile image from which a duplicated portion contained in the tile image is removed is generated. The processing shown in FIG. 5 is an example, and it is only necessary that the normalized tile image is extracted, and the processing method is not limiting.

Figure 6:
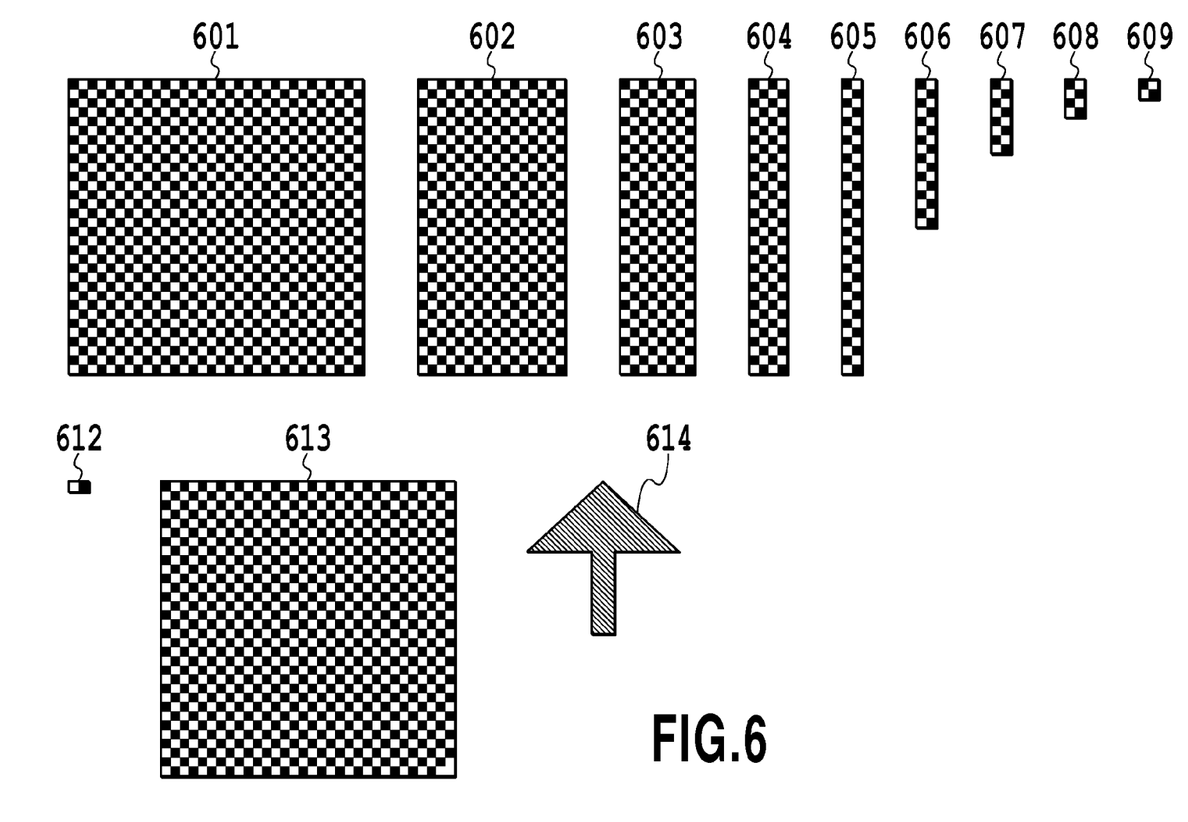
FIG. 6 is a diagram illustrating an outline of the normalized tile-image-generation processing.

FIG. 6 shows an embodiment of the case in which the flowchart shown in FIG. 5 is applied to a checkered pattern. The normalized tile is acquired for a tile image 601 having a checkered pattern with the same size of 32×32 as the tile image A (221). First, the removal of a duplicated portion in the width direction is attempted for the tile image 601. Since right and left symmetry is found in the tile image 601, the tile image is reduced to a tile image 602 with the size of 16×32. By repeating this processing, the duplicated portion is gradually removed as 16×32 (602)→8×32 (603)→4×32 (604)→2×32 (605). Symmetry in the width direction is not found in the tile image 605. Thus, subsequently, the removal of the duplicated portion in the height direction is attempted. The duplicated portion is similarly removed as 2×32 (605)→2×16 (606)→2×8 (607)→2×4 (608)→2×2 (609). Symmetry in the height direction is not found in the tile image 609. Thus, the tile image 609 is made the normalized tile image of the tile image 601. By applying the similar procedure to the tile image B (222), a normalized tile image 612 can be obtained. Also, as for the tile image C (223) and the tile image D (224), since there is no symmetry both in the vertical and horizontal directions, normalized tile images 613 and 614 are the original tile images 223 and 224 themselves.

Figure 4:
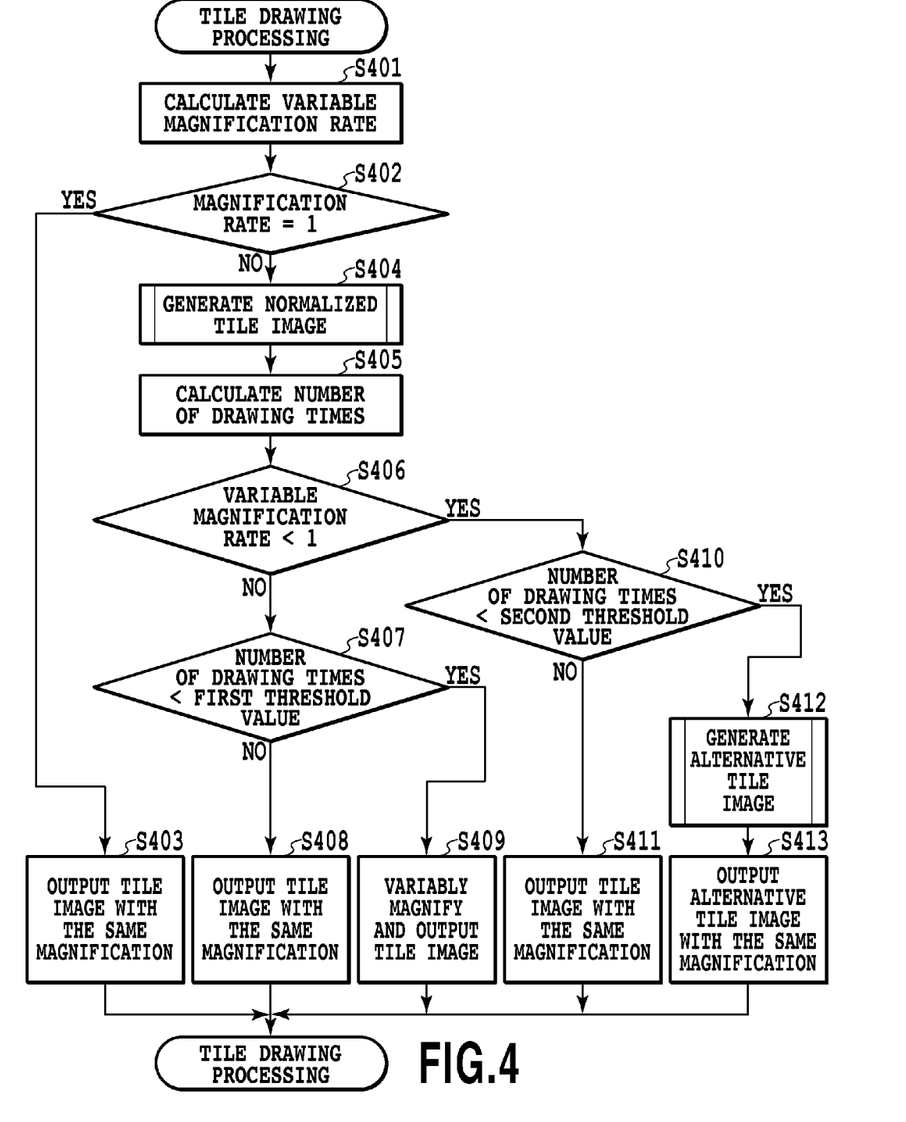
FIG. 4 is a flowchart illustrating an example of a tile-drawing processing in an embodiment.

The description returns to the tile-drawing processing in FIG. 4. Subsequently, from the size of the variably magnified drawing region (A3 size) and the size of the normalized tile image, the number of times that the normalized tile image can be drawn in the drawing region of the variably magnified tile image is calculated (S405). That is, the number of the normalized tile images that can be arranged in the drawing region of the variably magnified tile image is calculated. In the case of the normalized tile image 609 having 2×2 pixels, for example, the tile image is drawn repeatedly for (3331×3331)÷(2×2)=2,773,890 times. The number of repetitions of the normalized tile image 612 is (3331×3331)÷(2×1)=5,547,781 times. The number of repetitions of the normalized tile image 613 is (3331×3331)÷(32×32)=10,835 times, and the number of repetitions of the normalized tile image 614 is (3331×3331)÷(1182×1182)=7.94 times. Since the drawing region is a rectangle here, the number of drawing times can be simply calculated by an area ratio, but an approximate value may be acquired from a bounding box of the drawing region as an alternative.

Subsequently, it is determined if the variable magnification rate is not less than one or not (S406). In this embodiment, the case in which the variable magnification rate is not less than one, steps (S407, S408, S409) will be referred to. If the magnification rate is one, it is only necessary that the tile pattern specified for drawing is drawn with the same magnification as usual, and the detailed description will be omitted here.

The number of times to draw the normalized tile image calculated at S405 and a first threshold value are compared with each other (S407). If the number of drawing times is large as in the normalized tile images 609 and 612 shown in the example, the image in which the normalized tile image in the number of drawing times calculated at S405 is arranged with the same magnification is drawn as the tile image after variable magnification (S408). That is, if the number of drawing times calculated at S405 is large (not less than the first threshold value), data including the tile image in which the normalized tile image of the applicable number of times is arranged is generated as data after variable magnification.

By drawing as above, the drawing can be realized without variably magnifying the tile image itself contained in data for drawing, and the occurrence of moire can be prevented. Moreover, at this time, the density of the tile image is not changed even if the number of drawing times of the normalized tile image is increased. Therefore, according to the above processing, variable magnification processing of the tile image can be performed while deterioration in image quality, due to such factors as the existence of moire or a density change, is suppressed.

When the number of drawing times of the normalized tile image is small (that is, the number is smaller than the first threshold value), if the tile image is drawn with the same magnification, the result might be extremely different from the expected one. For example, if the normalized tile image 614 is drawn with the same magnification in the variably magnified region, the tile pattern is repeated 2.8 times each vertically and horizontally. In this case, the tile image, which is cut off in the middle of the drawing, can be induced, which is not a desirable output. Therefore, the first threshold value is set at an arbitrary value so that the above nonconformity is not caused.

If the number of drawing times of the normalized tile image is smaller than the first threshold value at S407, the normalized tile image is variably magnified so that the normalized tile image becomes the same size as the variably magnified region and drawn (S409). As another means, the portion containing this tile image may be enlarged and pre-rendered, limiting to the range of the drawing region.

According to the processing of this embodiment described above, if the variable magnification rate exceeds one, an image can be formed without variably magnifying the tile pattern itself, and deterioration in output image quality can be suppressed. As for the remaining processing steps S410, S411 and S412 in the flowchart in FIG. 4, the description will be provided in Embodiment 2.

Embodiment 2

Subsequently, the case in which the variable magnification rate is less than one will be described using a case of an output into a region having 160×160 pixels in order to perform index printing including this test data as an example. In this case, magnification of reduction by an output image width 160÷a logical page height 7016=0.023 times (1/44) is needed. The A4-size logical page is formed into an image having the size of 113×160 pixels. Also, a rectangle drawn on the logical page is drawn with the size of 54×54 pixels.

Similarly to Embodiment 1, the processing described below is performed by the processor 101 that executes the program stored in the memory 102 and the like.

In the case of an output using the prior-art technology, the tile image itself is variably magnified and drawn. For example, in the case of reduction of the tile image A having 32×32 pixels by 0.023 times (1/44), the result is 1×1 pixel. Since the tile image can be expressed only with extremely limited options of "painted" or "not painted", incorrect drawing occurs. This phenomenon is also referred to in Japanese Patent Laid-Open No. H06-214554 (1994).

A flow of processing when the present invention is preferably applied will be described on the basis of the flowchart in FIG. 4. However, since steps from S401 to S406 are the same as in Embodiment 1, the description will be omitted. At this time, since the magnification rate is 0.023 times, after the determination at S406, the process proceeds to S410.

Since the variable magnification rate imposed on the page is different from that in Embodiment 1, the calculated number of drawing times is also different. The number of times of drawing the normalized tile repeatedly when the tile image included in the variably magnified data is drawn on the physical screen is calculated from the size of the drawing region of the variably magnified tile image and the size of the normalized tile image (S405). For example, in the case of the normalized tile image 609 having 2×2 pixels, the drawing is repeated for the number of times of (54×54)÷(2×2)=729 times. The number of drawing times for the normalized tile image 612 is (54×54)÷(2×1)=1458 times. The number of drawing times for the normalized tile image 613 is (54×54)÷(32×32)=2.85 times. The number of drawing times for the normalized tile image 614 is (54×54)÷(1182×1182)=0.002 times, and in this case, only a part of the normalized tile image is drawn.

Even in the reduced printing, if the number of drawing times is relatively large as in the normalized tile images 609 and 612 (not less than the second threshold value), the normalized tiles in the number of drawing times calculated at S405 are drawn with the same magnification (S411). Then, incorrect drawing caused by inappropriate reduction of the tile image can be avoided. Therefore, the second threshold value is set at an arbitrary value that can avoid such incorrect drawing. That is, if the number of drawing times calculated at S405 is not less than the second threshold value at S411, data including the tile image in which the normalized tile image with the applicable number of times is arranged is generated as data after variable magnification.

On the other hand, if the number of drawing times is small as in the normalized tile images 613 and 614 (less than the second threshold value), alternative tile-image-generation processing is performed (S412), and drawing is made with the alternative tile image (S413).

Details of the alternative tile-image-generation processing will be described by referring to a flowchart in FIG. 7.

First, a case in which the normalized tile image has 1 bpp and 1 channel (normalized tile image is a binary image and monochrome) (S701; Y), and the width and the height of the normalized tile image is any one of 1, 2, 4 or 8 (S702; Y) will be described.

As a tile image for calculating a characteristic amount, a normalized tile image is repeatedly drawn on an image of 8×8 (S703). That is, the tile image for calculating a characteristic amount is an image having the same pattern as that of the tile image to be variably magnified. In the tile image for calculating a characteristic amount, the number of pixels whose value in each row and column is one is acquired (hereinafter referred to as the total number) (S704). That is, in a region with a predetermined area in which the normalized tile images in the number that can be arranged are drawn, the total number of pixels whose values are one is acquired. After that, on the premise that the upper and lower ends and the right and left ends of the tile image for calculating a characteristic amount are consecutive, respectively, the maximum consecutive number of the pixels whose values are consecutively one (hereinafter referred to as a consecutive number) is acquired (S705).

Figures 8, 8A:
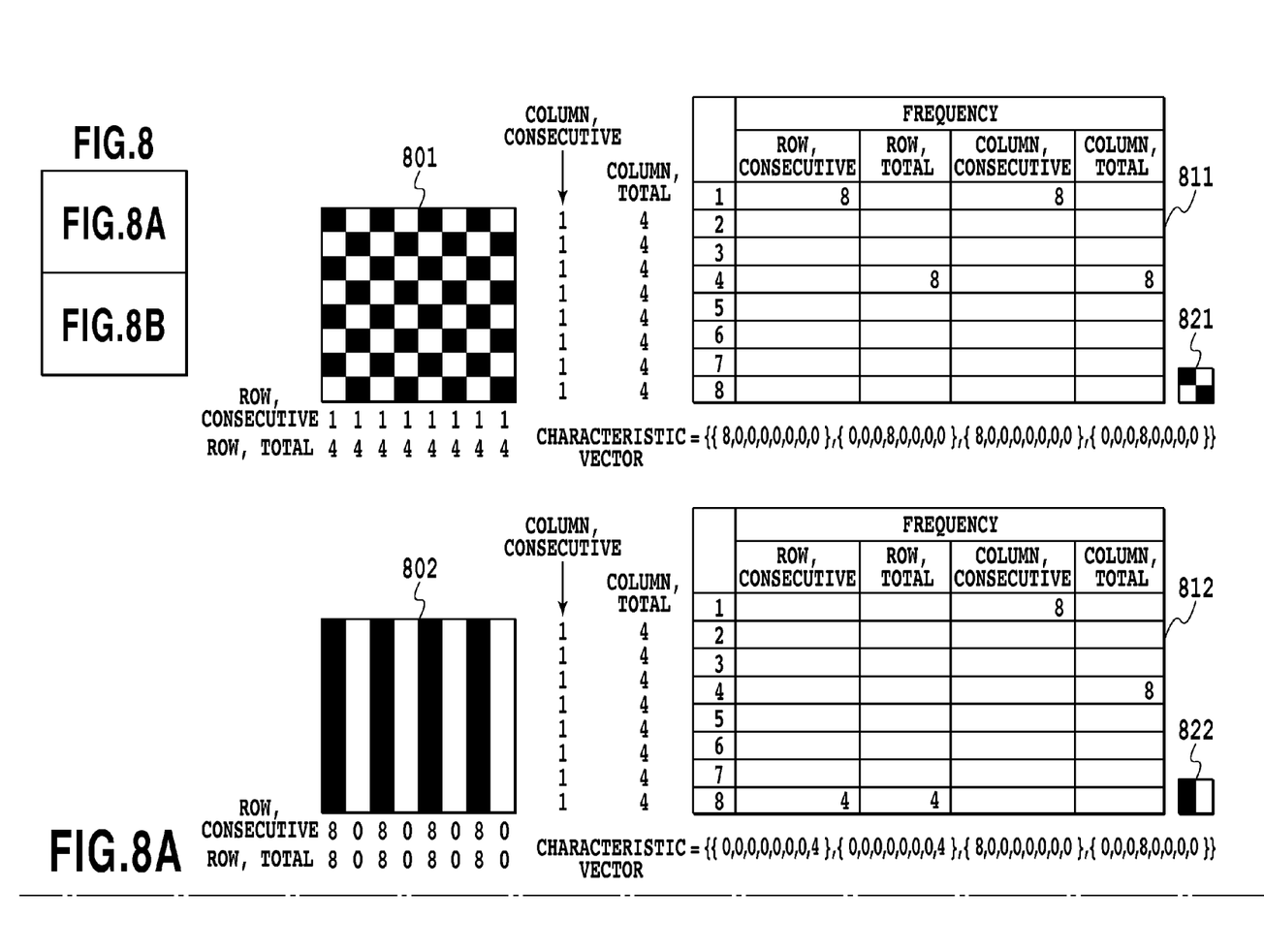
FIG. 8 is a diagram showing the relationship of FIGS. 8A and 8B.
FIG. 8A is a diagram illustrating an outline of the alternative tile-image-generation processing.
Figure 8B:
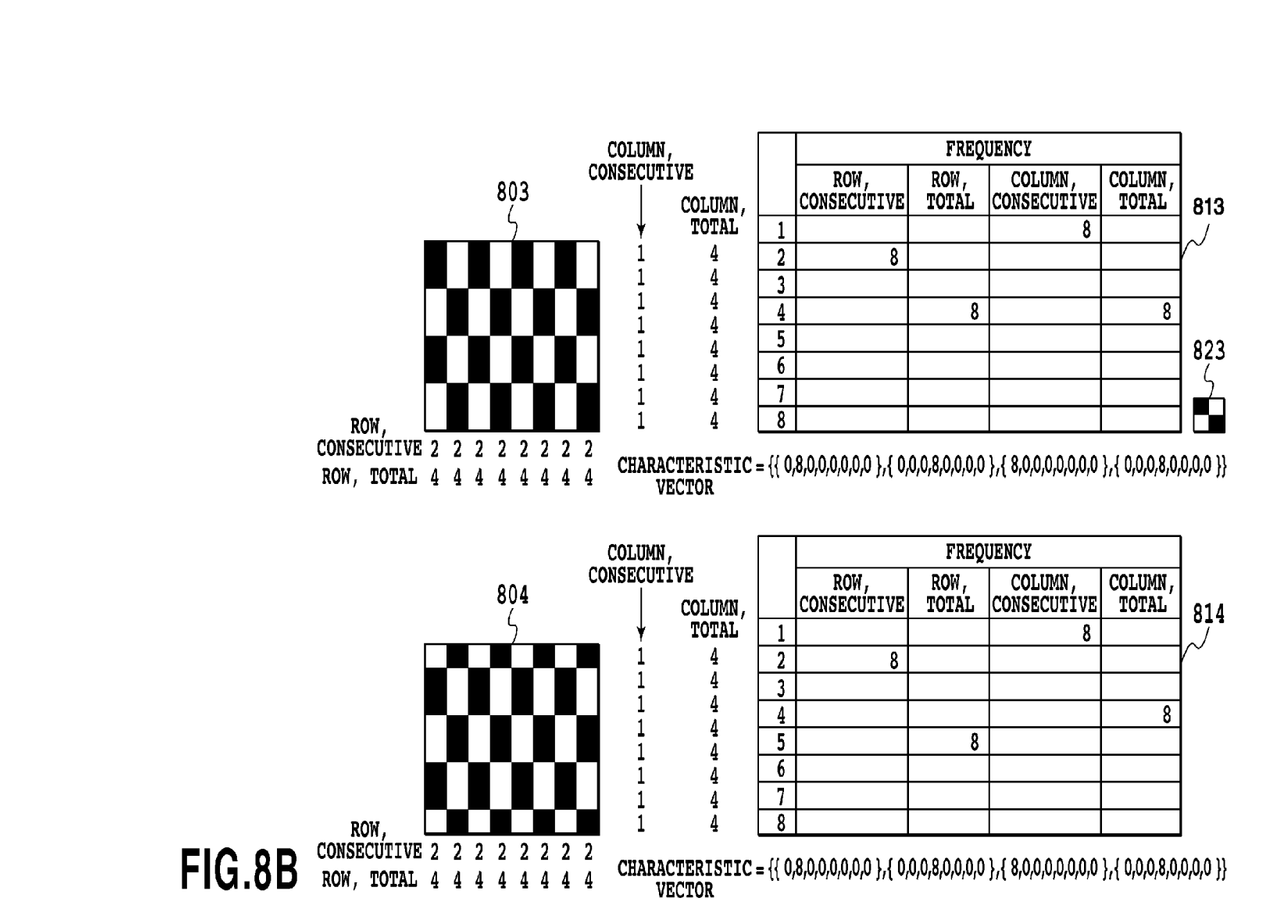
FIG. 8B is a diagram illustrating an outline of the alternative tile-image-generation processing.

For example, refer to FIGS. 8A and 8B. Here, it is assumed that black portions in the tile mean one and white portions mean zero. The pixels in the first column of a tile image 801 for calculating a characteristic amount, which is an 8×8 checkered pattern, are {1, 0, 1, 0, 1, 0, 1, 0} from the left. Therefore, the consecutive number of the first column is one and the total number is four. The results of the consecutive numbers and the total numbers of the second column and after are the same as that of the first column. Subsequently, according to the determination on the rows, the pixels on the first row are {1, 0, 1, 0, 1, 0, 1, 0} from the up. Thus, the consecutive number is one and the total number is four. The calculation results of the consecutive numbers and the total numbers of the second row and after are the same as that of the first row. The consecutive numbers and the total numbers are acquired as above.

Subsequently, frequencies of the consecutive number and the total number are acquired (S705). In this case, the number of columns with the consecutive number of one is eight, and the number of columns with the total number of four is eight. Similarly, the number of rows with the consecutive number of one is eight, and the number of rows with the total number of four is eight. As a result, as shown in reference numeral 811, in the frequency distribution focusing on the rows, the consecutive number is eight to one, and the total number is eight to four. Also, in the frequency distribution focusing on the columns, the consecutive number is eight to one, and the total number is eight to four.

Subsequently, a characteristic vector is acquired using this frequency distribution (S706). Here, the characteristic vector is defined as the respective frequency distributions aligned. That is, as for the reference numeral 801, they are the distribution of consecutive number for the rows {8, 0, 0, 0, 0, 0, 0, 0} and the distribution of total number {0, 0, 0, 8, 0, 0, 0, 0}. Also, an array in which the distribution of consecutive number for the columns {8, 0, 0, 0, 0, 0, 0, 0} and the distribution of the total number {0, 0, 0, 8, 0, 0, 0, 0} are connected is defined as a characteristic vector.

Calculation examples of the other characteristic vectors are shown in FIGS. 8A and 8B. Reference numeral 812 is an example of the calculated characteristic vector of reference numeral 802, the reference numeral 811 in FIG. 8B is an example of the calculated characteristic vector of reference numeral 803, and the reference numeral 814 is an example of the calculated characteristic vector of reference numeral 804, respectively. Here, attention should be paid to the fact that reference numeral 804 is obtained by shifting the tile image in reference numeral 803 upward (or downward) by one pixel. In matching processing of an image for the 8×8 tile image, in order to determine that images match even if they are shifted, all the patterns generated by the shifting need to be evaluated, and determination should be made on the basis of a matching degree of the maximum value in general. However, the frequency distribution of the consecutive number and the total number are not affected even if the images are shifted. Therefore, as described in this embodiment, determination processing can be simplified by using the characteristic vector focusing on the frequencies of the consecutive number and the total number.

The calculation method of the characteristic vector here is only an example and other characteristic vector calculation units are expected to obtain a similar effect as that of the present invention.

Subsequently, the characteristic vector of a template tile image and the characteristic vector calculated at S706 are compared so as to search the closest template tile image (S707). That is, a template tile image having the characteristic vector similar to the calculated characteristic vector is searched. The template tile image is a tile image with high use frequency determined as a template, and its characteristic vector is calculated in advance. The template tile image is stored in a storage portion such as the disk device 103 of the image forming apparatus 1. As a result, labors to store the tile image itself or to calculate the characteristic vector each time can be omitted.

Using FIGS. 8A and 8B as an example, reference numeral 801 is a tile image expressed with the characteristic vectors {{8, 0, 0, 0, 0, 0, 0, 0}, {0, 0, 0, 8, 0, 0, 0, 0}, {8, 0, 0, 0, 0, 0, 0, 0}, {0, 0, 0, 8, 0, 0, 0, 0}}. For this tile image, a template tile image of a checkered pattern is searched. Similarly, for the characteristic vectors {{0, 0, 0, 0, 0, 0, 0, 4}, {0, 0, 0, 0, 0, 0, 0, 4}, {8, 0, 0, 0, 0, 0, 0, 0} {0, 0, 0, 8, 0, 0, 0, 0}} as reference numeral 802, a template tile image of vertical strips is searched. Reference numerals 803 and 804 are tile images expressed by characteristic vectors {{0, 8, 0, 0, 0, 0, 0, 0}, {0, 0, 0, 8, 0, 0, 0, 0}, {8, 0, 0, 0, 0, 0, 0, 0}, {0, 0, 0, 8, 0, 0, 0, 0}}. For this tile image, a template tile image of a vertically elongated checkered pattern is searched.

A distance between the characteristic vector calculated above and the characteristic vector of each of the template tile images is acquired, and the one with the smallest distance is determined as the closest template tile image (S708).

Here, an alternative tile image is selected and associated with the respective template tile images. The alternative tile image is a normalized tile image of the template tile image. However, unlike the above-described normalized tile image, repetition of the pattern may not be fully removed in the case of the alternative tile image. The alternative tile image is stored in the storage portion such as the disk device 103 of the image forming apparatus 1. An alternative tile image 821 is associated with the checkered pattern 801, an alternative tile image 822 for the vertical stripe pattern 802, and an alternative tile image 823 for the elongated checkered pattern 803, for example. The size of the alternative tile image is optional, but the size should be such that drawing for the number of times not less than the second threshold value is possible in the drawing region of the tile image after variable magnification. Also, the alternative tile images having plural types of size may be prepared and switched for use in accordance with a drawing condition such as the variable magnification rate. For example, if gradation is insufficient with the alternative tile image of 2×2, an alternative tile image of 4×4 may be used.

The associated alternative tile image is copied (S708) and used for the processing after that. Subsequently, at S413 in FIG. 4, this alternative tile image is repeatedly drawn and used for drawing of a tile image so that an alternative image can be generated.

Figure 7:
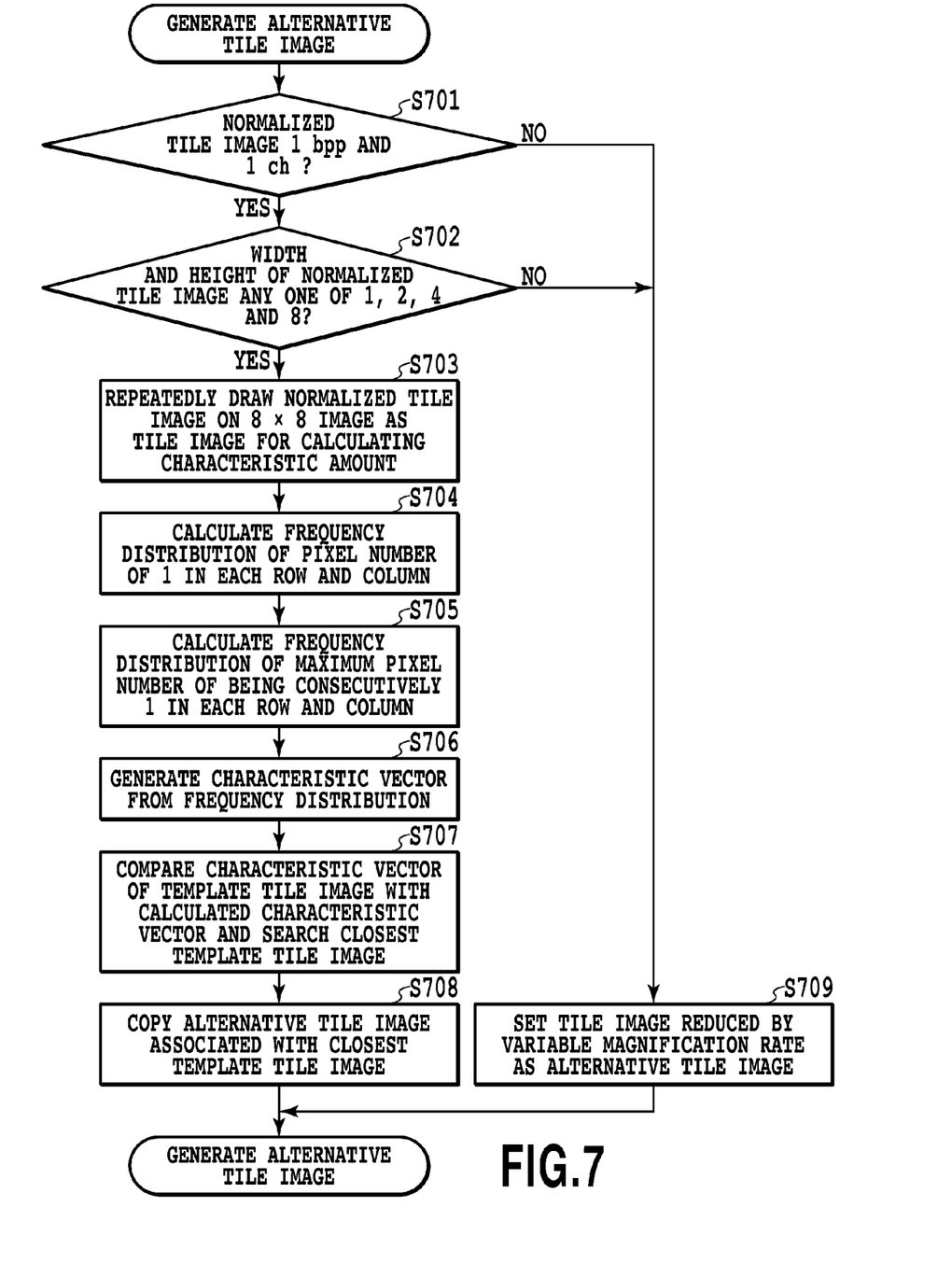
FIG. 7 is a flowchart illustrating an example of an alternative tile-image-generation processing.

According to the processing from S701 to S708 in FIG. 7 and S413 in FIG. 4 described above, first, if the variable magnification rate is less than one (S406; Y) and the number is less than the second threshold value (S410; Y), the characteristic vector of the tile image is generated (S701 to S706).

After that, the normalized tile image, which is a normalized tile image of the tile image having the characteristic vector similar to the generated characteristic vector and which can be arranged in the drawing region after the variable magnification in the number not less than the second threshold value, is selected as an alternative drawing region. After that, in the drawing region after the variable magnification, data including the tile image in which the selected alternative tile image is arranged with the same magnification is generated as data after the variable magnification.

As described above, if the number of drawing times of the normalized tile image is less than the second threshold value, a variably magnified tile image is generated by using the alternative image instead of the normalized tile image. As a result, the alternative image can be generated without losing the characteristics of the original tile image. Moreover, since undesirable thinning processing is not performed on the tile image, output quality can be improved.

Subsequently, if the condition is not satisfied at S701 or S702 in the flowchart in FIG. 7, the image is a color image or a multivalued image, and therefore a sufficient output can be obtained by performing image thinning by an averaging method or the like so as to generate an alternative tile image (S709). Other drawing means may be taken for this case by using other means.

As described above, according to the processing in FIG. 7, a desirable alternative tile image can be obtained for the tile image to be drawn. By drawing this alternative tile image without magnification at S412, particularly the variable magnification processing for the binary tile image can be avoided, and deterioration of the drawing result can be suppressed.

As described above, by preferably applying the present invention, even if the variable magnification rate is less than one (S406; Y), drawing can be made with a small tile while the characteristics of the tile image are maintained, and deterioration in output image quality can be suppressed.

Figure 9:
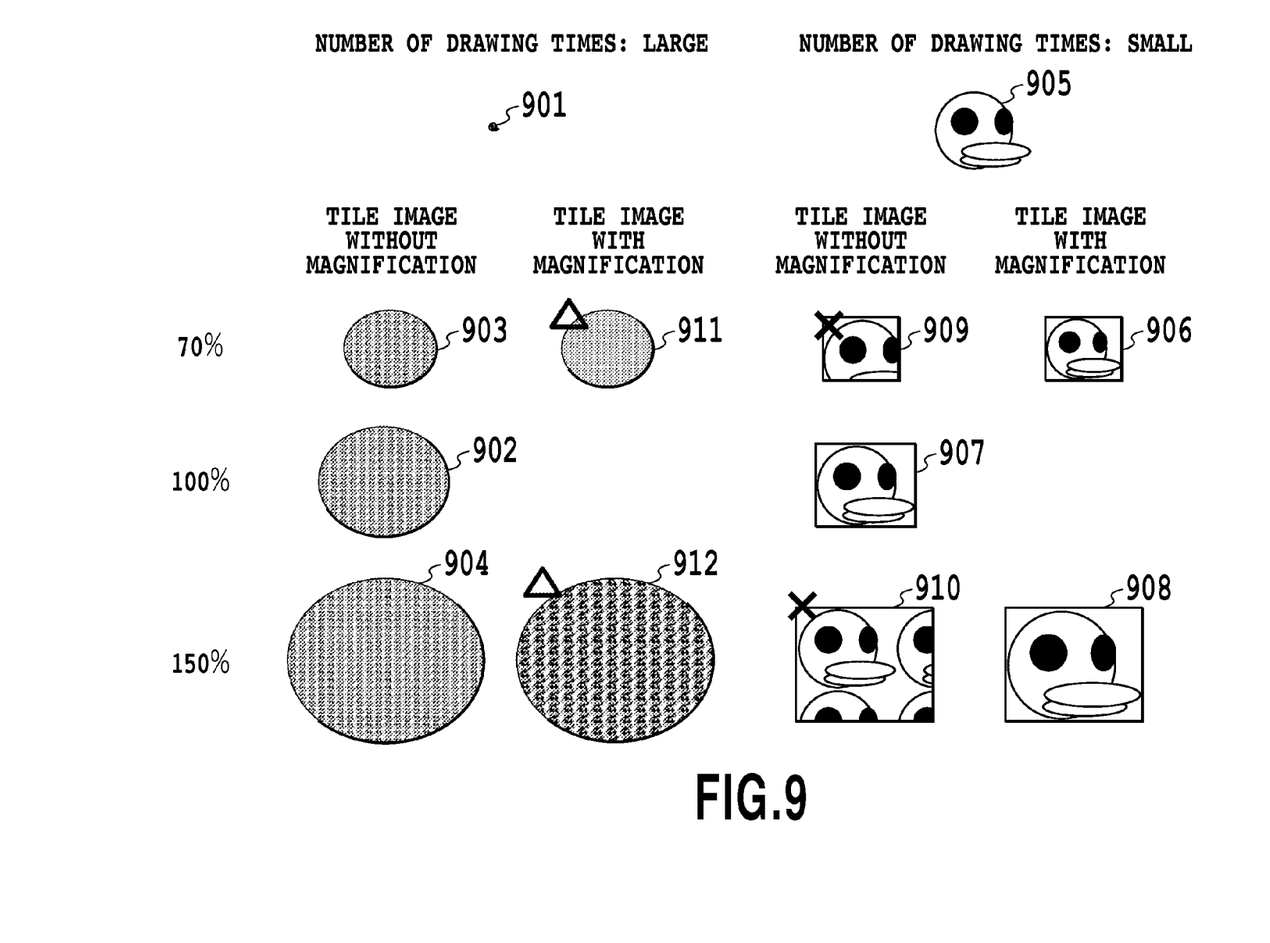
FIG. 9 is a diagram illustrating an influence of presence of the variable magnification processing for a tile image on an output image.

Finally, a behavior of the image forming apparatus to which the present invention is applied will be summarized using FIG. 9. If the number of drawing times of the normalized tile image is sufficiently large, that is, if the normalized tile image is sufficiently small with respect to the size of the variably magnified drawing region (901), the tile image itself is not magnified but the normalized tile image with the same magnification is drawn several times in the drawing region (903, 904). As a result, a decrease of the density caused by thinning during reduction (911) or an increase of the density caused by duplicated use of specific lines during enlargement (912) and the like can be avoided.

On the other hand, if the tile image is sufficiently larger than the variably magnified drawing region, that is, if the number of drawing times of the normalized tile image is small (905), the tile image itself is enlarged/reduced in accordance with the variable magnification rate and drawn (906, 908). As a result, drawing of only a part of the normalized tile image since the tile image itself is not subjected to variable magnification processing (909) or drawing more than the expected number of times (910) can be avoided.

As an example of the variable-magnification method, it is possible to extract characteristics of a tile image and to select the closest template tile image from the template tile image on the basis of the characteristics so as to obtain more desirable output than simple thinning of an image. Other than that, any variable magnifying units can be taken.

Also, if an image is to be output with the same magnification (902, 907), the present invention does not affect an output image.

According to the present invention, in accordance with the number of drawing times of the tile image, whether to execute the variable magnification processing for the tile image or not can be switched. For example, if an image is to be formed with desired output resolution, assume that the variable magnification rate exceeds one. If the number of drawing times is not less than the first threshold value, drawing without variably magnifying the tile image itself, duplicated drawing of specific rows/columns in the tile image can be avoided. If the number of drawing times is less than the first threshold value, by variably magnifying only the tile image, a calculation amount/used memory amount can be suppressed as compared with the variable magnification of the entire page.

On the other hand, if the number of drawing times is less than the second threshold value when the variable magnification rate is less than one, a desirable alternative tile image is acquired from the characteristic amount of the tile image and used for drawing. On the other hand, if the number of drawing times exceeds the second threshold value, the tile image is drawn with the same magnification. As a result, even if an image is formed with a resolution lower than the data resolution, loss of the characteristics of the original tile image can be suppressed.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-106619, filed May 6, 2010, which is hereby incorporated by reference herein in its entirety.

What is claimed is:

1. An image forming apparatus comprising:
a unit configured to generate a normalized tile image from a tile image, wherein the normalized tile image is a unit of a pixel pattern representing a characteristic of the tile image;
a unit configured to calculate the number of the normalized tile images that can be arranged in a drawing region after variable magnification of the tile image with a predetermined variable magnification rate;
a unit configured to generate a tile image in which the calculated number of the normalized tile images are arranged in the drawing region after the variable magnification, as the tile image after the variable magnification, if the calculated number is greater than or equal to a first threshold value; and
wherein the unit configured to generate a tile image as the tile image after the variable magnification generates, as the tile image after the variable magnification, an image obtained by variably magnifying the normalized tile image so that the size of the normalized tile image becomes the same as that of the drawing region after the variable magnification, if the calculated number is less than the first threshold value.

2. The image forming apparatus according to claim 1, wherein the unit configured to generate the tile image after the variable magnification generates, as the tile image after the variable magnification, a tile image in which the calculated number of the normalized tile images are arranged with the same magnification in the drawing region after the variable magnification, if the variable magnification rate is equal to or greater than one and the calculated number is equal to or greater than the first threshold value.

3. The image forming apparatus according to claim 1, wherein the unit configured to generate the tile image after the variable magnification generates, as the tile image after the variable magnification, data including the tile image in which the calculated number of the normalized tile images are arranged with the same magnification in the drawing region after the variable magnification, if the variable magnification rate is less than one and the calculated number is equal to or greater than a second threshold value.

4. The image forming apparatus according to claim 3, wherein the unit configured to generate the tile image after the variable magnification has:
a unit configured to generate a characteristic vector of the tile image if the variable magnification rate is less than one and the calculated number is less than the second threshold value;
a unit configured to select, as an alternative tile image, the normalized tile image which is the normalized tile image of a tile image among a plurality of normalized tile images of the tile image having a characteristic vector closest to the generated characteristic vector and which can be arranged in the drawing region after the variable magnification when the calculated number is not less than the second threshold value; and
a unit configured to generate the tile image in which the selected alternative tile image is repeatedly arranged with the same magnification in the drawing region after the variable magnification as the tile image after the variable magnification.

5. The image forming apparatus according to claim 4, wherein the unit configured to generate the characteristic vector obtains, if the normalized tile image of the tile image as a target of the variable magnification is a binary image, the number of pixels whose value in each row and each column in a predetermined region in which the normalized tile images are drawn in the number that can be arranged is one and generates the characteristic vector using the frequency of the pixel numbers.

6. The image forming apparatus according to claim 5, wherein if upper and lower ends and right and left ends of the predetermined region are consecutive respectively, a maximum consecutive number of the pixels whose value in each row and each column is one is obtained and the characteristic vector is generated using the frequency of the maximum consecutive number.

7. The image forming apparatus according to claim 4, further comprising:
a storage unit configured to store a plurality of template tile images having different characteristic vectors and the normalized tile images of the template tile images associated with each of the template tile images,
wherein the unit configured to select the alternative tile image selects the normalized tile image associated with the template tile image having the characteristic vector closest to the generated characteristic vector among the stored normalized tile images.

8. The image forming apparatus according to claim 1, wherein the unit configured to generate the normalized tile image has a unit configured to continuously delete either one of right and left images until patterns of the right and left images with reference to the center of the tile image become different patterns having a difference not less than a predetermined amount.

9. The image forming apparatus according to claim 1, wherein the unit configured to generate the normalized tile image has a unit configured to continuously delete either one of upper and lower images until patterns of the upper and lower images with reference to the center of the tile image become different patterns having a difference not less than a predetermined amount.

10. An image forming apparatus comprising:
a unit configured to generate a unit image of repetition in an image, wherein the unit image is a unit of pixel pattern representing a characteristic of the image;
a unit configured to calculate the number of the unit images that can be arranged in a drawing region based on a variable magnification rate of the image;
a unit configured to generate an image after variable magnification based on the variable magnification rate by arranging the calculated number of unit images in the drawing region, if the number calculated by the unit configured to calculate is greater than or equal to a threshold value; and
wherein the unit configured to generate an image after variable magnification generates the image after variable magnification based on the variable magnification rate by arranging an image obtained by variably magnifying the unit image so that the size of the unit image becomes the same as that of the drawing region, if the number calculated by the unit configured to calculate is less than the threshold value.

11. An image forming method performed by using a processor, the method comprising:
a step of generating a normalized tile image from a tile image, wherein the normalized tile image is a unit of a pixel pattern representing a characteristic of the tile image;
a step of calculating the number of the normalized tile images that can be arranged in a drawing region after variable magnification of the tile image with a predetermined variable magnification rate;
a step of generating a tile image in which the calculated number of the normalized tile images are arranged in the drawing region after the variable magnification, as the tile image after the variable magnification, if the calculated number is greater than or equal to a first threshold value; and
wherein the step of generating a tile image as the tile image after variable magnification generates, as the tile image after the variable magnification, an image obtained by variably magnifying the normalized tile image so that the size of the normalized tile image becomes the same as that of the drawing region after the variable magnification, if the calculated number is less than the first threshold value.

12. An image forming method performed by using a processor, the method comprising:
a step of generating a unit image of repetition in an image, wherein the unit image is a unit of a pixel pattern representing a characteristic of the image;

a step of calculating the number of the unit images that can be arranged in a drawing region based on a variable magnification rate of the image;

a step of generating an image after variable magnification based on the variable magnification rate by arranging the unit images, of the calculated number, in the drawing region, if the number calculated by the step of calculating is greater than or equal to a threshold value; and wherein the step of generating an image after variable magnification generates the image after variable magnification based on the variable magnification rate by arranging an image obtained by variably magnifying the unit image so that the size of the unit image becomes the same as that of the drawing region, if the number calculated by the step of calculating is less than the threshold value.

13. A non-transitory computer-readable recording medium storing a computer-executable program for performing a method using a processor, the method comprising:

a step of generating a normalized tile image from a tile image, wherein the normalized tile image is a unit of a pixel pattern representing a characteristic of the tile image;

a step of calculating the number of the normalized tile images that can be arranged in a drawing region after variable magnification of the tile image with a predetermined variable magnification rate;

a step of generating a tile image in which the calculated number of the normalized tile images are arranged in the drawing region after the variable magnification, as the tile image after the variable magnification, if the calculated number is greater than or equal to a first threshold value; and wherein the step of generating a tile image as the tile image after variable magnification generates, as the tile image after the variable magnification, an image obtained by variably magnifying the normalized tile image so that the size of the normalized tile image becomes the same as that of the drawing region after the variable magnification, if the calculated number is less than the first threshold value.

14. A non-transitory computer-readable recording medium storing a computer-executable program for performing a method using a processor, the method comprising:

a step of generating a unit image of repetition in an image, wherein the unit image is a unit of a pixel pattern representing a characteristic of the image;

a step of calculating the number of the unit images that can be arranged in a drawing region based on a variable magnification rate of the image;

a step of generating an image after variable magnification based on the variable magnification rate by arranging the unit images, of the calculated number, in the drawing region, if the number calculated by the step of calculating is greater than or equal to a threshold value; and wherein the step of generating an image after variable magnification generates the image after variable magnification based on the variable magnification rate by arranging an image obtained by variably magnifying the unit image so that the size of the unit image becomes the same as that of the drawing region, if the number calculated by the step of calculating is less than the threshold value.

* * * * *